May 23, 1967  H. F. MEINERS  3,320,685
DIFFRACTION APPARATUS
Filed April 29, 1964  3 Sheets-Sheet 1
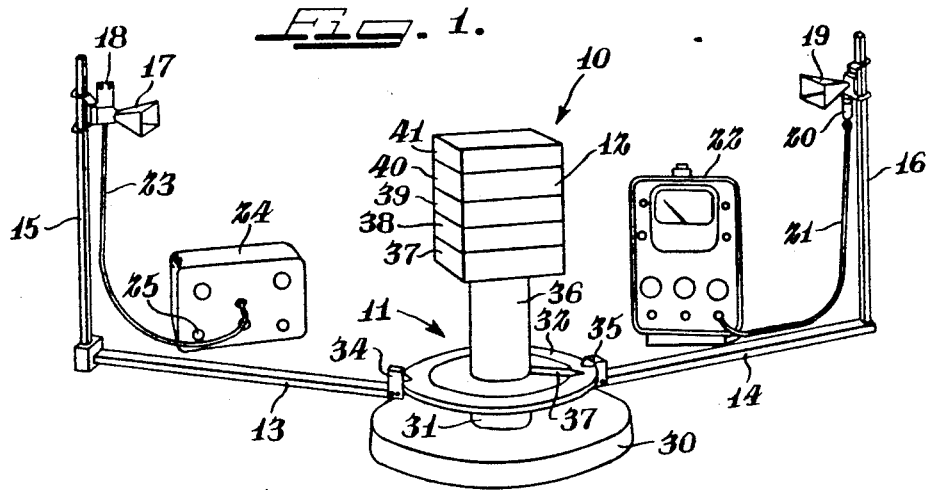
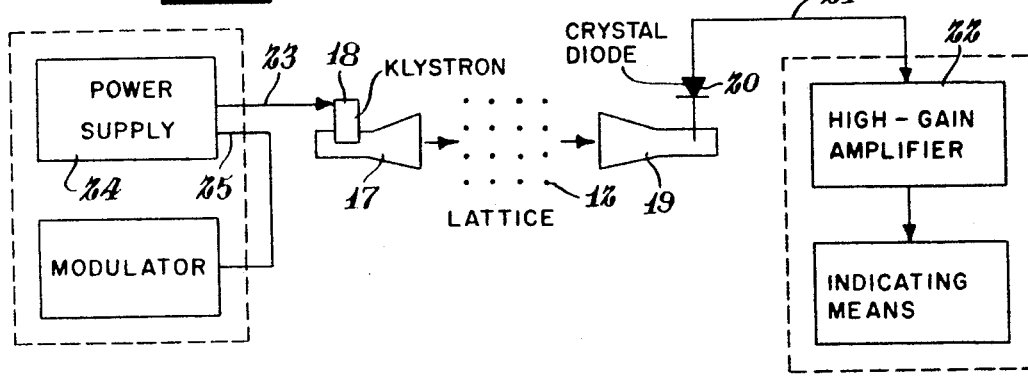
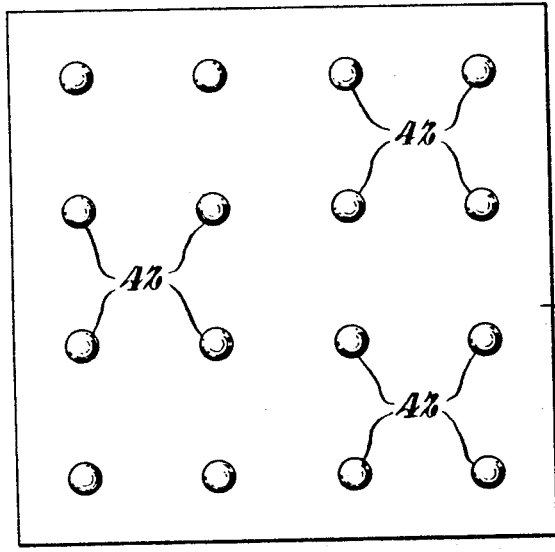
INVENTOR
HARRY F. MEINERS
BY Greist, Lockwood,
Greenawalt & Dewey
Attys.

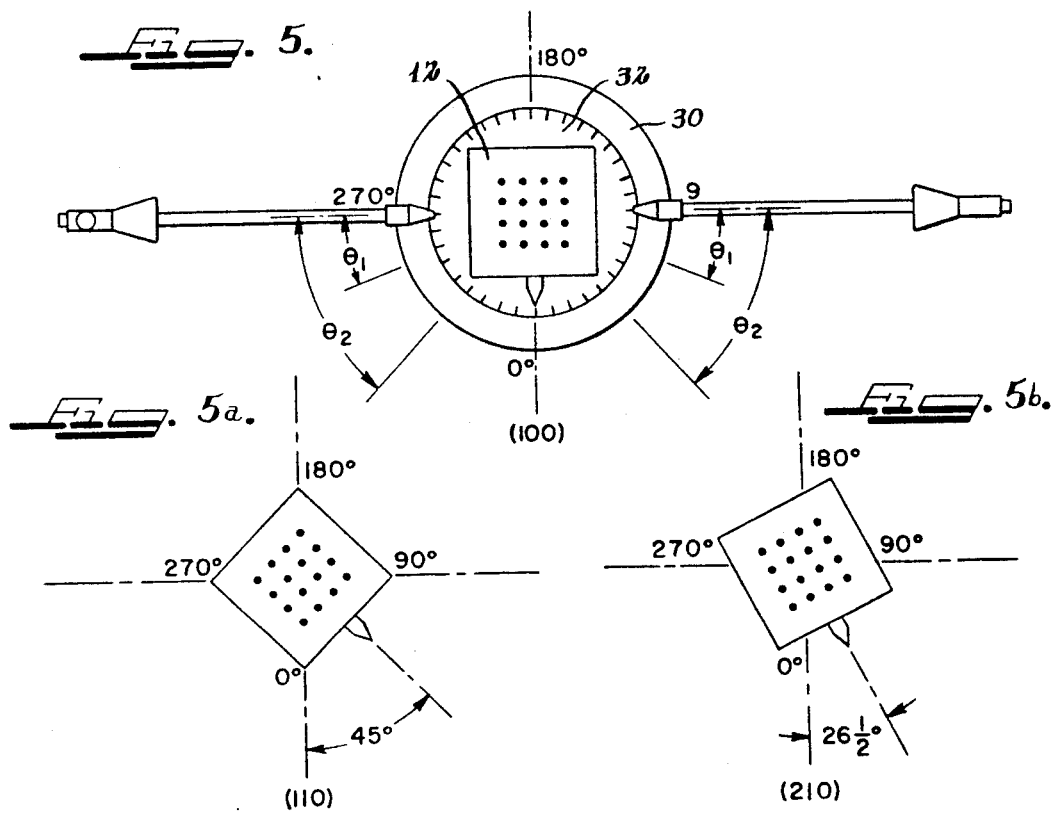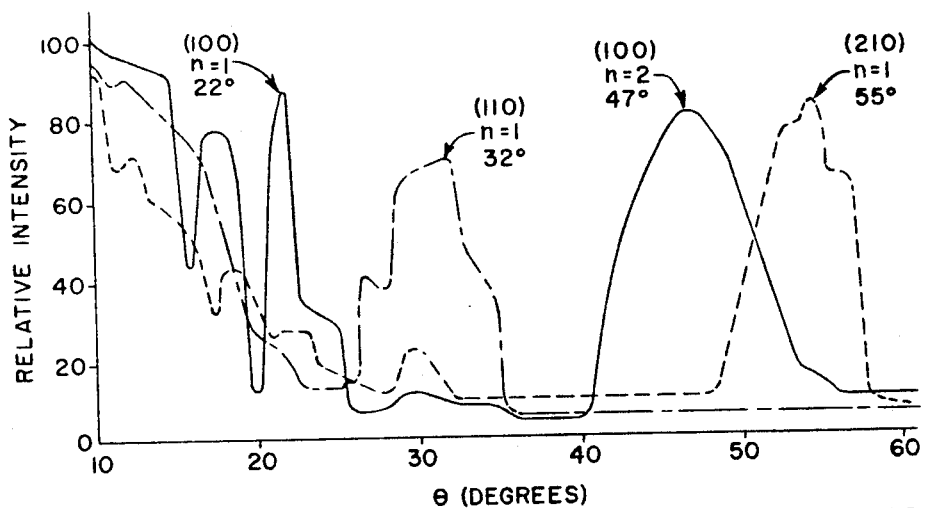

May 23, 1967
H. F. MEINERS
3,320,685
DIFFRACTION APPARATUS
Filed April 29, 1964
3 Sheets-Sheet 3
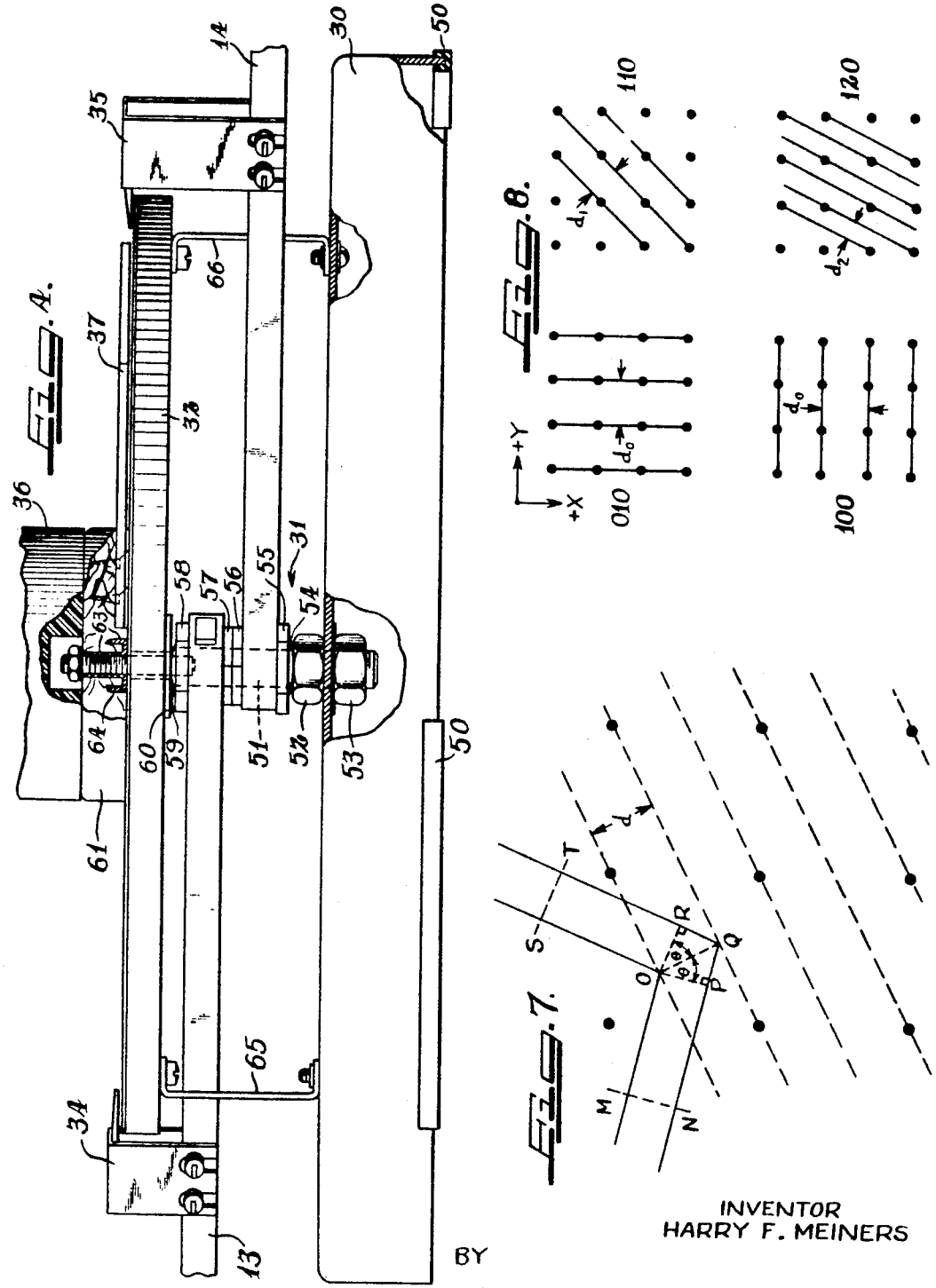
INVENTOR
HARRY F. MEINERS
BY
Greist, Lockwood, Greenawalt & Dewey
Attys.

United States Patent Office 3,320,685
Patented May 23, 1967

3,320,685
DIFFRACTION APPARATUS
Harry F. Meiners, Latham, N.Y., assignor to The Welch Scientific Company, Chicago, Ill., a corporation of Illinois
Filed Apr. 29, 1964, Ser. No. 363,409
1 Claim. (Cl. 35—19)

This invention relates to a spectrometric diffraction apparatus in general, and more particularly is directed to apparatus for use as a demonstration to permit a student or instructor to effect a quantitative analysis of crystal structure applying Bragg's Law of diffraction on a macroscopic scale.

In 1912, W. L. Bragg derived a relation which explained X-ray diffraction effects in terms of reflection from a family of atomic planes within a crystal. As will be explained hereinafter, certain conditions are necessary for the accurate application of the relationship. In the instruction of introductory physics students for evident reasons, it is inadvisable to permit them to perform experiments with hazardous X-rays, assuming the necessary equipment is available. Obviously, X-ray equipment and the surrounding structure necessary to shield the X-rays is, practically speaking, prohibitive from the economic standpoint.

The present invention permits the student to investigate or the instructor to demonstrate Bragg's Law of diffraction on a macroscopic scale with equipment of a relatively simple design utilizing microwaves as contrasted with X-rays. The unique design contributes to economical manufacture thereby placing the apparatus well within the economic reach of most introductory physics laboratories. Microwaves which are used in the present invention, eliminate hazards experienced in using X-rays, making experiments completely safe for students. A more complete comprehension of the invention and the advantages achieved thereby will be had upon a consideration of the stated objects and the attendant description of the device to follow.

It is a principal object of this invention to provide a spectrometric diffraction apparatus for use in effecting a quantitative investigation of simulated crystal structures, said apparatus being of a simplified form to be used by introductory physics students.

It is a further object of this invention to provide a spectrometric apparatus and method for use in effecting a quantitative investigation of crystalline structures, said crystalline structures being simulated by arranging a plurality of spheres, which are reflective to microwave energy, in a cubic, body-centered cubic, or face-centered cubic lattice (other crystal lattice structures such as hexagonal close packed can also be investigated) and providing means transparent to the microwave energy to hold said spheres in the desired spaced relation each to the other, to define atomic planes.

It is a further object of this invention to provide a novel spectrometric diffraction apparatus having a simulated crystal structure disposed upon a support means and a microwave energy source directing energy onto said simulated crystal and further including receiver means to pick up said energy reflected from said simulated crystal and a detector means to indicate the intensity of the signal received.

It is a further object of this invention to provide a spectrometric apparatus for use in the physics laboratory as a teaching aid to permit the student or instructor to effect a quantitative investigation of crystalline structures through the application of Bragg's Law of diffraction.

Further and fuller objects will become readily apparent when reference is made to the accompanying drawings wherein:

FIG. 1 is a perspective view of the spectrometric diffraction apparatus of the present invention as set up to perform the diffraction experiment;
FIG. 2 is a block diagram of the diffracted apparatus of FIG. 1;
FIG. 3 is a typical plan view of one of the layers forming the simulated crystal;
FIG. 4 is an enlarged elevational view of the supporting base of the spectrometer with the booms shown fragmentarily and parts in section to show the detailed features;
FIG. 5 is a top plan view of the spectrometer of FIG. 1;
FIGS. 5A and B are schematic plan views of recommended lattice orientations;
FIG. 6 is a graphical representation of data obtained in performing the diffraction experiment;
FIG. 7 is an enlarged schematic plan view of incident wave energy falling on a family of planes in a crystal; and
FIG. 8 indicates several families of planes in a simple cubic crystal to illustrate the reduction in the intensity of diffracted waves as the number of diffracting centers per unit area in a plane decrease.

*General description*

Referring now to FIG. 1, a spectrometric apparatus, adapted to perform the Bragg diffraction experiment described briefly above, is indicated generally by the reference numeral 10. The spectrometric diffraction apparatus 10 includes a spectrometer indicated generally at 11 providing support means adapted to support a simulated crystal lattice 12 and a pair of booms 13 and 14. As will become more apparent hereinafter, relative rotation between the booms 13 and 14 and the simulated crystal lattice 12 is possible with the present structure.

At the end of each of the booms 13 and 14 is provided an upstanding rod 15 and 16 respectively for reasons to become apparent. Each of the rods 15 and 16 may be joined to the booms by means of slide blocks to permit movement along the associated boom broadening the field of application of the apparatus. The upstanding rod 15 supports a transmitter horn 17, also shown in the block diagram of FIG. 2, in an adjustable manner to allow the horn to be rotated, and/or raised and lowered to direct the output therefrom onto the crystal 12. The transmitter horn 17 supports a reflex klystron 18 of known form which is provided with a cavity adapted to be tuned by mechanical adjustment of a screw means, causing slight change in the cavity dimension and the spacing between the cavity grids. Output power is obtained from an antenna which is approximately ¼ wave length and extends into a wave guide section connected to the transmitter horn.

It has been found that microwaves of the order of about 3 centimeters are particularly well suited for the quantitative investigation of the optical properties of electromagnetic radiation because the radiation is monochromatic and plane polarized. Since the wave length is much longer than that of light, both laboratory experiments and lecture demonstrations in physical optics can be performed easily on a convenient, observable scale with simple accessories. Since microwave radiation is analogous to that of light, the use of microwaves permits the student to understand wave phenomena which are fundamentally the same for each form of radiation.

As pointed out above, the boom 14 supports the rod 16 which in turn adjustably supports a receiver horn 19 also shown in the block diagram of FIG. 2. The receiver horn 19 can be rotated in a horizontal plane and raised or lowered. In addition, the receiver horn may be attached to the rod 16 in such a way as to allow the horn to be rotated in a vertical plane so that polarization studies can be made. For this purpose, a reference pointer may be attached to the horn to co-operate with a protractor mounted on the rod 16 so that the horn is turned in a vertical plane, the angle through which the horn is moved can be read from the protractor. A detector is indicated generally at 20 which is electrically connected through the conductor 21 to a suitable indicating means 22 which, as illustrated in FIG. 1, is a standing wave indicator. As will be described more specifically hereinafter, other forms of indicators may be used also with slight changes in the other accessory equipment required.

The reflex klystron 18 of FIGS. 1 and 2 is electrically connected through a conductor or lead 23 to the output of a power supply 24 having an input jack 25 for external modulation by any suitable means if the particular indicating means used requires the same.

The spectrometric diffraction apparatus 11 includes a base or pedestal 30 having a suitable upstanding column 31 to mount the booms 13 and 14 for rotation about a central axis. The particular construction of the column 31 and connection of the booms 13 and 14 thereto will be described more completely hereinafter in connection with FIG. 4.

Immediately above the column 31 is provided a circular table portion 32 having a 360° protractor imprinted or mounted thereon. Accurate measurement to 1° is preferred to maintain the accuracy of the experiments within reasonable limits. An indicator or pointer 34 and 35 is provided on each of the booms 13 and 14 to permit direct reading and computation of the angularity between the two booms. A column 36 is supported for rotation relative to the pedestal 30 and table 32 and is provided with a plastic pointer or indicator 37 to indicate the position of the simulated crystal 12 relative to the pointers 34 and 35. The column 36 is formed of foamed plastic material which is transparent to microwave energy while the table 32 may be formed of non-transparent materials such as plastic, wood, or the like.

The crystal 12 is supported by the column 36 and comprises in one form a foam plastic matrix which is transparent to microwave radiation. The crystal 12 is formed of separable layers 38, 39, 40 and 41 resting on a base layer 37 which forms a support therefor. As seen in FIG. 3, each of the layers 38–41 is provided with a series of aluminum spheres 42 rectangularly arranged to simulate the structure of the atoms in a crystal. When each of the separable layers 38–41 are stacked in the position shown in FIG. 1 they form a cubic lattice of aluminum spheres about 4 centimeters apart in an 18 x 18 x 18 centimeter cube or foam plastic matrix which is transparent to the microwave energy. It is contemplated that a removable plastic cover (not shown) which is also transparent to microwave radiation of the order of about 3 centimeters, may be placed over the crystal 12 to hold the separable layers 38–41 in place. Removal of the plastic cover and separation of the layers 38–41 allows direct measurement of the spheres to check theoretical computations based on diffraction measurements with those obtained by direct measurement.

Specific description

Having broadly described the spectrometric diffraction apparatus, a more detailed description will be given of each of the individual components used. Referring now to FIG. 4, the detailed constructional features of the spectrometer or crystal support assembly will become more apparent. The base 30, as illustrated in the broken away portion in the right hand portion of FIG. 4, is provided with an extruded rubber channel 50 extending for a short distance around the margin. Two other channels (only one shown) are provided around the base at 120° intervals to act as a cushion against shocks and prevent marring of the supporting surface. The column assembly 31 extending from the pedestal 30 includes a central shaft 51 bolted to the base by means of nuts 52 and 53 co-operating with the threaded end of the shaft. A spring washer 54 and flat bushing 55 overlie the top of the nut 52 and support the boom 14. A pair of bushings 56 and 57 overlie the top of the boom and support the underside of the transmitter boom 13 while an additional bushing 58, spring washer 59 and flat washer 60 complete the column assembly 31 below the protractor table 32. A wooden base 61 is provided above the protractor 32 to mount the indicator or pointer 37 and is joined to the foam column 36 by means of an adhesive. A shaft 63 is received in a T nut liner 64 which is driven into the wooden base 61 with the shaft 63 projecting downwardly into the lower shaft 51 with a bearing fit.

The outer marginal edges of the protractor table are supported by means of brackets 65 and 66 which are appropriately spaced to permit the booms 13 and 14 to move the required distance to perform the experiment as will become apparent hereinafter. The assembly shown is suitable to support the cantilevered loads on the booms 13 and 14 in a substantially rigid manner so that the transmitter and receiver horns are substantially rigidly mounted as is the simulated crystal 12 to enhance the accuracy of results. The brackets 65 and 66 may be mounted at 0° and 180° to allow the receiver and transmitter booms, which are positioned at 90° and 270° respectively, free movement of about 90° in either direction.

The reflex klystron 18 shown in FIGS. 1, 2 and 5 may be a 2K25, 723A-B vacuum tube obtainable from Sperry Electronic Tube Division. The klystron contains a resonant cavity capable of sustaining oscillations at frequencies between 8 and 10 gigacycles ($10^9$) per second. Operation of the klystron 18 depends upon a principle known as velocity modulation. Assume for example, a stream of electrons passing between two electrodes. If alternating voltage is applied to the electrodes and the period of alternation is long compared to the transit time of the electrons, electrons will be alternately accelerated and decelerated as they pass the electrodes. The electron stream will leave the region of the electrodes in groups or bunches. Alternate groups have high velocities, the rest low and the electron stream is now said to be velocity modulated.

It is possible to cause the klystron to cease operation by changing the voltage on the repeller. To the attainment of this end, a square wave is supplied to the repeller from the power supply 24. The amplitude of the square wave is such that the klystron can oscillate only during one half of the cycle. The square wave frequency may be 1,000 cycles per second and this process, known as amplitude modulation, allows the superposition of the 1,000 cycle per second modulating signal on the microwave carrier described above. The 1,000 cycle per second square wave signal is supplied from an audio generator to modulate the klystron reflector. The small changes in voltage on the reflector produced by the square waves alter the interval between the "electron bunches" so that the resonant cavity is unable to sustain oscillations, thereby effectively turning the klystron on and off at 1,000 cycles per second.

The transmitter horn 17 is of rectangular cross section and is rotatable and vertically adjustable on a conventional support rod 15, which may be of the order of 10 millimeters in diameter. Obviously, other microwave optic experiments may be performed with the diffraction spectrometer illustrated.

The receiver horn 19 is similar in construction to the transmitter illustrated at 17, and serves to direct the energy to an ultra high frequency rectifier which is mounted in a small cartridge as indicated at 20 in FIG. 1. The silicon crystal rectifier 20 is a 1N23 diode or the equivalent which has a non-linear element offering extremely high resistance to current flow in one direction and very little resistance in the opposite direction. The crystal 20 is a small signal or "square law detector" and the current through it is approximately proportional to the square of the amplitude of the signal voltage. The indicating means 22 may take various forms including galvanometers of known type readily obtainable on the market having a sensitivity of less than 0.01 microampere per division.

As illustrated in FIG. 1, the indicating means 22 is an A.C. detector such as a Hewlett-Packard type 415B standing wave indicator which provides an amplified audio frequency signal directly readable or having an output usable to drive an oscilloscope or loudspeaker. Since the frequency of the standing wave indicator is tuned to 1,000 cycles per second, 1,000 cycles per second square wave modulation is used. Another form of A.C. detector indicator 22 usuable with the spectrometer 11 is a sensitive vacuum tube voltmeter. An X-Y plotter could also be connected to the apparatus to effect plotting simultaneously with the performance of the experiment. When an oscilloscope or loudspeaker is used for A.C. detection as would be the best practice in limited lecture demonstrations, the conductor or cable 21 from the receiver horn is connected to a power amplifier and the output used to drive the oscilloscope or loudspeaker.

In performing diffraction studies, the simulated crystal 12 is a cubic lattice formed of aluminum spheres of the order of about 10 millimeters in diameter placed about 4 centimeters apart in a foam plastic matrix which is about 18 centimeters on a side. As pointed out above, the matrix is transparent to microwave radiation of the order of about 3 centimeters. The separable layers 38–41 forming the matrix permit the cubic lattice to be disassembled for manual measurement of the spacing of the spheres in order that the measured distance may be compared with computations based on diffraction measurements and the error calculated.

*Theory and operation*

In using the spectometer diffraction apparatus, certain relationships such as Bragg's Law must be known. As briefly pointed out above, Bragg derived at a relation which explained X-ray diffraction effects in terms of reflections from a family of atomic planes within a crystal. The conditions necessary for Bragg diffraction are:

(1) No matter what the value of the incident angle, each individual plane consisting of an ordered array of diffracting centers in the family acts as a plane mirror. The reflected waves reinforce each other to produce maximum intensity when the angle of incidence equals the angle of reflection. In the case of reflections from atomic planes, the angle theta ($\theta$) is the angle between the incidence or reflected beam and the plane rather than the angle between the beam and the normal to the plane, as is customary in optics.

(2) When a beam of radiation strikes a family of parallel planes, each plane will reflect part of the energy. If the reflected waves from O and Q indicated in FIG. 7 are to be in phase (interfere constructively), the path difference $PQ+QR=2d \sin \theta$ must equal an integral number of wave lengths or $2d \sin \theta = n\lambda$ where $n=1, 2, 3, 4$ .... The path length N, Q, T is an integral number of wave lengths longer than the length M, O, S.

The latter equation above is Bragg's Law and governs the diffraction of waves in parallel planes in the simulated crystal lattice shown. As contrasted to the mirror behavior of a single plane which gives reflections for any angle $\theta$, only particular values of $\theta$ will satisfy Bragg's Law and allow constructive interference. For other angles there is no reflected beam because of destructive interference.

The perpendicular distance between adjacent parallel planes is represented in FIGS. 7 and 8 by the reference "$d$" and denoted by different subscripts. As seen in the latter figure, other families of planes which have a different spacing or "$d$" value are present in the same crystal. Each of these families is identified by a number known as its Miller indices which is shown adjacent the crystal in FIG. 8. A more comprehensive discussion of the Miller indices will be given hereinafter. There is a decrease in the number of atoms per plane associated with a decrease in the distance "$d$" for a simple cubic structure which has the same type of atom at each lattice site. Reflections therefore become weaker as "$d$" decreases, however this is not, in general, true for more complex structures.

In the analysis of a crystal at a specific orientation with monochromatic radiation, a spectrum of reflections is obtained as a function of the angle theta ($\theta$). It is possible to calculate the inter planar spacing "$d$" for the family of planes contributing to the maximum peak(s) if the value of theta ($\theta$) corresponding to the strongest reflection peak is used in Bragg's relationship. Obviously, reflections are produced by more than one family of planes so long as Bragg's Law is satisfied. The weaker reflections are observed as background effects in a plot of relative reflection intensity v. the angle. Depending on which family of planes is investigated with monochromatic radiation, various order of diffraction are obtained. When the apparatus is set up as shown in FIG. 1 by the instructor or student, the latter assumes that the lattice constant "$d$" is not known. The wave length of the microwave energy used is known or can be readily determined by simple experimentation. It has been found that three centimeter microwaves are particularly well suited for the quantitative investigation of the simulated crystal 12. Suitable adjustment in the gain control of the indicator is effected, as well as the appropriate adjustment of the range switch to shift the meter sensitivity to obtain the appropriate or optimum deflection for the signal level being measured. The Miller indices may be calculated by student or alternatively provided by the instructor. By way of explanation the indices are the reciprocal values of the X, Y and Z intercepts cleared of fractions. For example, a plane with intercepts $X=1$, $Y=1$ and $Z=\infty$ has indices of 110.

The data is taken and plotted, that is, the meter scale reading v. the angle, beginning with the booms placed so that they are 180° apart as in FIG. 2 and at the 0° at the plane from which the data will be taken. For example, in the plan of FIG. 5, data is obtained for the (100) planes by first moving the transmitter 13 1° and then moving the receiver boom 1° and marking down the intensity indicated on the meter. The pair of booms, therefore, are each moved at equal angular increments toward each other until they no longer can be closed.

In FIG. 5A, the transmitter boom lies along the 270° line while the receiver boom lies along the 90° line and the crystal is oriented at a position 45° from the 0° reference position. Again the transmitter boom starting from the 270° line and the receiver boom starting from the 90° line are moved toward each other at equal angular increments of 1° (data being recorded for each new position) until they can be closed no further. Data for the 210 planes is obtained with the crystal oriented at 26½° as shown in FIG. 5B and the booms positioned at 270° and 90° as noted above.

The readings are taken at every 1° and the intensity level as indicated on the meter is recorded. Theta ($\theta$) and the respective readings from the indicating means permit a plot to be obtained which is of the type illustrated in FIG. 6.

The solid lines are for the relative reflection intensity v. the angle for a 100 family of planes which is taken with the lattice and booms 13 and 14 oriented as seen in the plan view of FIG. 5. The phantom lines in FIG. 6 are a graphical representation of reflection intensity v. the angle for the 110 planes which is indicated in FIG. 5A. The dash lines in FIG. 6 indicate reflections from the 210 planes of FIG. 5B.

The interplanar spacing of the crystal $D_o$ used in the investigation forming the basis of the plot was 4.35 centimeters and the wave length lambda ($\lambda$) was equal to 3.2 centimeters. The apparatus was arranged in the center of the laboratory and all other equipment which could have produced spurious reflections was removed. In this regard, it is advisable to place the detector power supply and miscellaneous accessory equipment below the level of the spectrometer. Additionally, it is advisable to observe and plot the data very carefully between 0° and 20° because the $n=1$ peaks for the (100) planes is always near the direct feed through region. Best results are obtainable in rooms with plaster or concrete walls.

The $n=1$ peaks for the 110 and 210 families of plane are obtainable with little difficulty. If spurious reflections are very troublesome, a sheet of microwave absorbant material should be used. One absorbant which has been found useful is a mat of spun animal hair impregnated with rubber containing carbon black which provides a conduction loss of R-F energy and will absorb about 99% of the incident energy. Absorbants of this kind are useful when precision microwave optic experiments are performed particularly in rooms with highly reflective walls such as those found of metal.

Although the instant embodiment is described in connection with diffraction through the use of microwaves, the spectrometric apparatus is useful in performing a number of additional experiments including reflection of microwaves, refraction of microwaves by Lucite and paraffin prisms, rotation of the plane of polarization by randomly oriented springs, and diffraction from multiple slits to mention a few.

Upon a consideration of the foregoing description it will become obvious to those skilled in the art that modifications are possible without departing from the scope of the invention, and therefore it is intended that any limitations imposed be within the spirit and scope of the appended claim.

I claim:

The method of demonstrating Bragg's Law on a macroscopic scale comprising the steps of positioning a microwave transmitter on a first spectrometer boom, said microwave transmitter being adapted to emit microwave energy, positioning a microwave receiver on a second spectrometer boom to receive said energy, each of said booms being movable relative to the other about an axis, positioning a simulated crystal on said axis substantially above the level of said first and second booms thereby to avoid reflections therefrom, said simulated crystal being formed by a plurality of metal spheres held in oriented spaced relation a distance greater than the wave length of said microwave energy by a plurality of separable layers of material, each of which is transparent to said microwave energy but opaque to human vision, thereby precluding visual detection of the location of said spheres, radiating said simulated crystal with said microwave energy, moving said first and second booms angularly about said axis toward each other in equal angular increments, measuring and recording the intensity of radiation reflected from said crystal at said angular increments during movement of said first and second booms, recording data of said intensity versus the angle to permit plotting a curve, calculating the spacing of said spheres from the application of Bragg's Law and separating said layers of said simulated crystal to permit direct measurement of the spacing of said spheres to check said calculations.

References Cited by the Examiner

UNITED STATES PATENTS

| | | | |
|---|---|---|---|
| 2,143,160 | 1/1939 | McLachlan | 35—19 |
| 2,579,324 | 12/1951 | Kock | 343—911 |
| 2,643,336 | 6/1953 | Valensi | 343—911 |
| 3,235,974 | 2/1966 | Hall | 35—19 |

OTHER REFERENCES

Harvey: "Optical Techniques at Microwave Frequencies," published in the Proceedings of the Institution Electrical Engineers, volume 106, part B, 1959, pages 141–151 relied on.

EUGENE R. CAPOZIO, *Primary Examiner.*

H. S. SKOGQUIST, *Assistant Examiner.*